(12) United States Patent
Suzuki et al.

(10) Patent No.: US 9,074,308 B2
(45) Date of Patent: Jul. 7, 2015

(54) BATTERY SEPARATOR COMPRISING A POLYOLEFIN NANOFILAMENT POROUS SHEET

(75) Inventors: Akihiro Suzuki, Yamanashi (JP); Takehiro Toyooka, Tokyo (JP); Akira Matsuo, Tokyo (JP); Takeshi Nishizawa, Tokyo (JP); Atsuo Omaru, Tokyo (JP)

(73) Assignees: University of Yamanashi, Yamanashi (JP); JX Nippon Oil & Energy Corporation, Tokyo (JP)

( * ) Notice: Subject to any disclaimer, the term of this patent is extended or adjusted under 35 U.S.C. 154(b) by 193 days.

(21) Appl. No.: 13/638,426

(22) PCT Filed: Apr. 22, 2011

(86) PCT No.: PCT/JP2011/059896
§ 371 (c)(1),
(2), (4) Date: Nov. 30, 2012

(87) PCT Pub. No.: WO2011/136133
PCT Pub. Date: Nov. 3, 2011

(65) Prior Publication Data
US 2013/0065133 A1      Mar. 14, 2013

(30) Foreign Application Priority Data

Apr. 30, 2010 (JP) ................................. 2010105128

(51) Int. Cl.
*H01M 2/16* (2006.01)
*H01M 2/00* (2006.01)
(Continued)

(52) U.S. Cl.
CPC ........... *D04H 3/016* (2013.01); *Y10T 29/49108* (2015.01); *H01M 2/145* (2013.01); *H01M 2/162* (2013.01); *H01M 10/0525* (2013.01); *D04H 3/03* (2013.01)

(58) Field of Classification Search
CPC ....... H01M 2/16; H01M 2/162; H01M 2/145; H01M 10/0525; D04H 3/016; D04H 3/03
USPC .......... 429/253, 254, 144; 29/623.5; 264/481; 156/157, 181, 205
See application file for complete search history.

(56) References Cited

U.S. PATENT DOCUMENTS 1,812,592 A    6/1931 Hermann
(Continued)

FOREIGN PATENT DOCUMENTS

EP    1 022 790    7/2000
EP    1 689 008    8/2006
(Continued)

OTHER PUBLICATIONS

Notification of Transmittal of Translation of the International Preliminary Report on Patentability (Chapter I or Chapter II of the Patent Cooperation Treaty) corresponding to International Patent Application No. PCT/JP2011/059896 dated Dec. 20, 2012.
(Continued)

*Primary Examiner* — Kenneth Douyette
(74) *Attorney, Agent, or Firm* — Jenkins, Wilson, Taylor & Hunt, P.A.

(57) ABSTRACT

Disclosed is a highly safe battery separator, in particular a separator for a lithium ion secondary battery, which reduces internal resistance, achieves good ionic conductivity, prevents passing of electrode active materials, and also prevents electrical short circuit by controlling deposition of lithium metal (dendrite). Also disclosed is a means for stably producing the battery separator with high productivity. Specifically disclosed are: a battery separator which is composed of a porous polyolefin sheet that is formed from a group of polyolefin nanofilaments that have an average filament diameter of less than 1 μm and a filament size distribution of 0.2 or less; and a means for producing the battery separator.

7 Claims, 11 Drawing Sheets

(51) Int. Cl.
*D04H 3/016* (2012.01)
*D04H 3/03* (2012.01)
*H01M 2/14* (2006.01)
*H01M 10/0525* (2010.01)

(56) References Cited

U.S. PATENT DOCUMENTS

| | | | |
|---|---|---|---|
| 1,975,504 A | | 10/1934 | Formhals |
| 2,508,043 A | * | 5/1950 | Schaefer ............... 162/62 |
| 3,453,709 A | | 7/1969 | Dyer |
| 3,870,567 A | * | 3/1975 | Palmer et al. ........... 156/167 |
| 4,030,901 A | | 6/1977 | Kaiser |
| 5,582,843 A | | 12/1996 | Sellars et al. |
| 6,071,641 A | * | 6/2000 | Zguris ................. 429/144 |
| 6,120,939 A | | 9/2000 | Whear et al. |
| 6,176,952 B1 | | 1/2001 | Maugans |
| 6,551,545 B1 | | 4/2003 | Hutter et al. |
| 7,101,504 B2 | | 9/2006 | Suzuki |
| 8,057,730 B2 | | 11/2011 | Suzuki |
| 2004/0098023 A1 | | 5/2004 | Lee |
| 2004/0116019 A1 | | 6/2004 | Zucker et al. |
| 2005/0054254 A1 | | 3/2005 | Erickson et al. |
| 2005/0067732 A1 | | 3/2005 | Kim |
| 2006/0006585 A1 | | 1/2006 | Suzuki |
| 2006/0073389 A1 | | 4/2006 | Sudou et al. |
| 2006/0182960 A1 | | 8/2006 | Suzuki |
| 2006/0286446 A1 | | 12/2006 | Chun et al. |
| 2008/0242171 A1 | | 10/2008 | Huang et al. |
| 2010/0148406 A1 | | 6/2010 | Suzuki |

FOREIGN PATENT DOCUMENTS

| | | |
|---|---|---|
| EP | 1 918 430 | 5/2008 |
| EP | 2 103 723 | 9/2009 |
| JP | 9-302563 | 11/1997 |
| JP | 2002-510128 | 4/2002 |
| JP | 2002-513868 | 5/2002 |
| JP | 2003-166115 | 6/2003 |
| JP | 2004-107851 | 4/2004 |
| JP | 2004-115980 | 4/2004 |
| JP | 2005-520068 | 7/2005 |
| JP | 2005-539154 | 12/2005 |
| JP | 2006-500247 | 1/2006 |
| JP | 2006-506171 | 2/2006 |
| JP | 2006-057228 | 3/2006 |
| JP | 2006-225837 | 8/2006 |
| JP | 2006-244804 | 9/2006 |
| JP | 2006-527911 | 12/2006 |
| JP | 2009-517554 | 4/2009 |
| JP | 2009-299212 | 12/2009 |
| WO | WO 2004/027130 | 4/2004 |
| WO | WO 2005/057700 | 6/2005 |
| WO | WO 2005/083165 | 9/2005 |
| WO | WO 2007/062393 | 5/2007 |
| WO | WO 2008/084797 | 7/2008 |
| WO | WO 2011/136133 | 11/2011 |

OTHER PUBLICATIONS

Supplementary European Search Report corresponding to European Patent Application No. 11 774 915.0-1308 / 2557213 dated Jul. 19, 2013.
International Preliminary Report on Patentability corresponding to International Patent Application No. PCT/JP2008/050103 dated Jul. 29, 2008.
International Search Report corresponding to International Patent Application No. PCT/JP2008/050103 dated May 1, 2008.
International Search Report corresponding to International Patent Application No. PCT/JP2011/059896 dated Aug. 16, 2011.
Notice of Allowance corresponding to U.S. Appl. No. 12/522,698 dated Aug. 19, 2011.
Office Action corresponding to U.S. Appl. No. 12/522,698 dated Apr. 4, 2011.
Supplementary European Search Report corresponding to European Patent Application No. 08702974.0-1217/2103723 dated Feb. 21, 2011.
Suzuki et al., "Isotactic Polypropylene Microfiber Prepared by Carbon Dioxide Laser-Heating," Journal of Applied Polymer Science. vol. 92 pp. 1534-1539 (2004).
Suzuki et al., "Nylon 6 Microfiber Prepared by Carbon Dioxide Laser Heating," Journal of Applied Polymer Science. vol. 92 pp. 1449-1453 (2004).
Suzuki et al., "PET Microfiber Prepared by Carbon Dioxide Laser Heating," Journal of Applied Polymer Science. vol. 88 pp. 3279-3283 (2003).
You et al., "In Vitro Degradation Behavior of Electrospun Polyglycolide, Polylactide, and Poly(lactide-co-glycolide)," Journal of Applied Polymer Sci. vol. 95 pp. 193-200 (2005).

* cited by examiner

BATTERY SEPARATOR COMPRISING A POLYOLEFIN NANOFILAMENT POROUS SHEET

CROSS-REFERENCE TO RELATED APPLICATIONS

This application is a national phase application of PCT International Patent Application PCT/JP2011/059896 filed Apr. 22, 2011, which claims benefit of JP 2010105128, filed Apr. 30, 2010, each of which is herein incorporated by reference in its entirety.

FIELD OF THE INVENTION

The present invention relates to a battery separator comprising a porous sheet composed of polyolefin filaments whose average diameter is less than 1 µm, and relates more specifically to a highly safe lithium-ion secondary battery which has low internal resistance and good ionic conductivity, prevents passing of electrode active material, and also prevents electrical short circuit by controlling lithium metal depositions (dendrites).

BACKGROUND OF THE INVENTION

Evolutionary improvement of batteries is the most important element in recent advancements of electric automobiles and mobile electrical devices. A battery separator is a basic structural element of a battery, and improving performance of the separator is an important factor in achieving higher battery performance and making batteries smaller and safer. A porous film comprising a polyolefin film has previously been used as a battery separator, but the film method had a limitation of increasing the number of pores. Therefore, attempts have been made to create a non-woven cloth separator using microfibers (JP2004-15980A and the like). However, the use of a sea-islands structure type fiber method to manufacture a fine filament made the process complicated. The filament obtained in this manner was not sufficiently fine, and the steps needed to cut the filament and convert the short fibers into a non-woven cloth were complex, creating problems in terms of both quality and cost.

The electro-spinning method (henceforth referred to as the ES method) is a typical technique used to create fibers used in non-woven cloth as fine in a nanoscale as possible (You, Y., et. al "Journal of Applied Polymer Science, Vol. 95, p. 193-200, 2005"). However, the ES method, which involves dissolving a polymer in a solvent and applying high voltage, is unacceptable in the case that there is no safe solvent, such as in the case of polyolefin. In addition, a web created using the ES method does not contain continuous filaments and also contains short fibers since the filaments are cut during spinning. One of the problems is the generation of many molten resin lumps that are larger than the fiber diameter due to the shrinkage of cut sections during spinning. In addition, a molten type ES method that was conducted without using a solvent was tried (JP2009-299212A and the like), but the average fiber diameter did not reach a nanoscale. In addition, many defects greater than the fiber diameter were thought to be generated, resulting in problems similar to those observed in the solvent method. Furthermore, both a laser and a high voltage electrode were used in the manufacturing process which results in a complex process and causes both quality and cost problems when the process is used to manufacture a battery separator. Moreover, a melt-blown method is also one of the manufacturing processes used to create a super fine filament non-woven cloth, but the filament diameter reaches a nanoscale only with difficulty and the generation of molten resin lumps causes similar problems.

The present invention is obtained applying the technology which was a filament drawing technology using infrared radiation for heating under reduced pressure and an application of which was previously filed by the inventors (International Publication Number WO2008/084797A1). The present invention further improves the technology so that the technology can be effectively applied to a battery separator comprising a porous polyolefin sheet.

CROSS REFERENCE TO RELATED APPLICATIONS

Patent Document 1: JP2004-115980 (Claims 1-3)
Patent Document 2: JP2009-299212 (Claim 1, FIGS. 1 and 4)
Patent Document 3: International Publication No. WO2008/084797A1 (Pages 1-2, FIGS. 1-3)

Non-patent Document

Non-patent Document 1: You, Y., et. al "Journal of Applied Polymer Science, Vol. 95, pp. 193-200, 2005 (USA)

SUMMARY OF THE INVENTION

Problems to be Solved by the Invention

The purpose of the present invention is that resides in a highly safe battery separator with low internal resistance and good ionic conductivity that prevents passing of electrode active material and also prevents shorting by controlling lithium metal depositions (dendrites). More specifically, the present invention presents a battery separator for lithium ion secondary batteries and also presents a means to manufacture the battery separator consistently with good productivity.

Means to Solve the Problems

The present invention relates to a battery separator. A battery is a device that directly delivers direct current electrical power that has been generated by the electrical potential difference generated by a chemical reaction and so on. Among many different types of batteries, the present invention relates to a chemical battery and particularly relates to a secondary battery that can be repeatedly charged and used. Recently extremely high performance, downsizing, higher output power and improved safety of the secondary batteries are highly desired. The present invention was developed to respond to these demands. Among all the secondary batteries, lithium ion batteries have attracted much attention recently due to their high output power and excellent storage capacity. The present invention relates to a battery separator designed to enhance the performance of lithium ion batteries within the class of chemical batteries. Such lithium batteries encompass large batteries designed to be used in automobiles as well as small button batteries.

The present invention relates to a battery separator. A battery separator segregates the positive electrode and the negative electrode in a battery, prevents electrical short circuit between electrodes, and retain the electrolyte solution to insure ionic conductivity between the positive and negative electrodes. Therefore, a battery separator is required to be electrically insulating to prevent short circuits, to retain electrolyte solution well to achieve a good ionic conductivity, and to be stable in electrolyte solution. A battery separator is also required to have the physical strength needed in an assembly process and to prevent passing of active materials presented in a battery in the form of micron size particles. Furthermore a battery separator needs to enhance the safety function that prevents short circuits by controlling the deposition of metals such as lithium metal (dendrite).

The battery separator of the present invention comprises a porous sheet composed of polyolefin filaments. A polyolefin is a polymer formed by the polymerization of an olefin monomer containing a carbon-to-carbon double bond in the molecule. Polypropylene, high density polyethylene, and polymethylpentene (PMP) are particularly utilized in the present invention, and modified resins thereof are also used. Polyolefin exhibit good chemical resistance, are not decomposed in electrolysis solutions and can be used as stable battery separators. In addition, polyolefin have good oxidation resistance and contribute to longer operating life.

The polyolefin porous sheet of the present invention is characterized by the constituting filaments (filament grouping) comprising nanofilaments with an average filament diameter of less than 1 μm. A filament is a type of fiber that is basically of continuous length and is usually longer than ordinarily staple fibers that are about 50 mm long. The filaments are at least 100 mm long. The aspect ratio (length/diameter) is very large, particularly in the present invention, since the filament diameter is small, and the filament is basically continuous. The filament in the present invention is characterized as a nanofilament with an average filament diameter of less than 1 μm, but an average filament diameter of 0.7 μm or less is more desirable, and an average filament diameter of 0.5 μm or less is most preferred. The filament diameter (the average filament diameter) is obtained by counting one hundred filaments using an electron microscope at a magnification of from several thousand to twenty-thousand and calculating a mathematical average. Since the filament of the present invention has a small diameter, the number of filaments in a set area increases. The number of apertures constituting a porous sheet is extremely large, and the aperture diameter is micronized. A high performance battery separator is created by increasing the number of apertures and reducing the aperture size.

Since the filament of the present invention is a continuous filament, it is characterized by very few resin pieces referred to as lumps or shots. The small resin lumps or shots are thought to be generated by shrinking of both sides of cutting pieces when filaments are cut during spinning or drawing. The porous sheet of the present invention comprises drawn polyolefin filaments, and the filament diameter is on a nanoscale. However, the filament rarely breaks during drawing and does not generate lumps or shots since it is basically a continuous filament. Therefore, a high performance battery separator can be obtained.

Drawn nanofilaments constituting a porous sheet in the present invention are characterized by a very consistent filament diameter. The filament diameter distribution is obtained using SEM (Scanning Electron Microscopy) photographs and software for measuring the diameters of one hundred filaments. In addition, the standard deviation is calculated from the measurements and is used as a measure of the filament diameter distribution. Furthermore, the average value of the filament diameter is obtained using the measurement method and is used as the average filament diameter for the present invention. The standard deviation of the filament diameter distribution for ordinary spun-bonded non-woven fabric and melt-blown non-woven fabric is more than 0.5, but the standard deviation in a nanofilament porous sheet of the present invention was 0.2 or lower and was preferably 0.1 or lower in spite of the fact that the filament diameter was smaller. A consistent filament diameter results in uniform pore size of the filament, lots of number of filaments per weight of a porous sheet, and inexistence of extremely thick or extremely thin filament. This gives the porous sheet excellent chemical stability, such as chemical resistance and the like.

The nanofilaments constituting the porous sheet of the present invention are characterized by super high multiple drawing, and the multiple is at least 100,000, preferably 200,000 and most preferably at least 500,000. Such super high multiple drawing forms filaments with nanosized diameter. The high quality battery separator described above is obtained using these filaments. In addition, the extensive drawing induces high strength low elongation as described below and high degree of molecular orientation which improves crystallinity, resulting in the development of thermal stability.

As described above, the nanofilaments constituting the porous sheet of the present invention are subjected to super high multiple drawing and are characterized by high strength and low elongation. The nanofilaments have extremely small filament diameter, and a single filament is difficult to handle. Therefore, the filament strength is difficult to measure. However, the high degree of thermal stability indicated by DSC measurement is an indication of a high degree of molecular orientation. The high strength displayed by the porous sheet is an advantage when incorporating a battery separator into a battery. The low elongation results in good dimensional stability when dynamic external force is applied and makes the porous sheet easier to incorporate into a battery. Thus, the porous sheet is highly compatible with automatic assembly devices.

A non-woven cloth is ordinarily a porous sheet formed by some kinds of confounding fibers. The number of polyolefin filaments per unit weight is extremely large in the present invention since the filament diameter is very small. Therefore, filaments tangle without a confounding step when polyolefin filaments are accumulated similarly to melt-blown non-woven fabrics manufacturing process, so a sheet can be formed using a simple pressing process. Means such as thermal embossing, needle punching, water-jet machining, and adhesive bonding may naturally be used.

The polyolefin porous sheet of the present invention is an application of an earlier invention (Patent Document 3) to polyolefin filaments, an earlier invention which was developed by one of the inventors of the present invention and was obtained by using super high multiple filaments drawing means involving a carbon dioxide gas laser beam and the pressure difference between orifices. Superdrawning by a multiple of several 10,000 to several 100,000 of the original polyolefin filaments with a filament diameter of from several tens of micrometers to several hundreds of micrometers yields super fine filaments with a diameter of from several micrometers to several tens of nanometers. The drawn filaments are accumulated to form a porous sheet. The original polyolefin filaments of the present invention are filaments manufactured and then wound on a reel and the like. The filaments obtained by cooling or coagulating filaments fused or dissolved in the spinning step can be used in the subsequent spinning step as the original filaments of the present invention. The original filaments are preferably used individually, but from several to several tens of the filament may also be used.

In the present invention, the original filaments transferred from a filament let-off step are drawn. Many types of filament transfer methods such as nip rollers, a combination of several stages of driving rollers and the like may be used to transfer the original filaments at a constant transfer rate.

In the present invention, many polyolefin original filaments are transferred at P1 pressure using a transfer method and are introduced into a drawing chamber under P2 pressure (P1>P2) through orifices. The many filaments (filament grouping or clump) that passed through the orifices are heated using carbon dioxide gas laser beam irradiation, and the traction generated by the gas flow caused by the pressure difference between P1 and P2 is used to draw the filaments. Now, a preferred mode of operation is to have the pressure P1 be atmospheric pressure and the pressure P2 be a reduced pressure inside the drawing chamber when the original filaments are discharged since the pressure difference is conveniently achieved. When P1 is added pressure and P2 is reduced pressure, the pressure difference between P1 and P2 can be agreeable without creating an intense degree of pressure reduction for P2. Now, the drawing chamber is sometimes divided into a drawing chamber in the narrow sense in which original polyolefin filaments are drawn using a laser beam and a filaments accumulation chamber in a narrow sense in which the drawn filaments are stacked at the orifices discharge outlet, but the drawing chamber in the narrow sense and the filament accumulation chamber in the narrow sense are connected into one unit and maintained at the same pressure as each other to constitute a drawing chamber in the broad sense.

Now, ordinary room temperature air is used to generate P1 and P2. However, heated air is sometimes used when attempting to preheat original filaments or attempting to heat treat drawn filaments.

The original filaments supply chamber and the drawing chamber in the present invention are connected by orifices. Inside the orifice, high speed gas flow is created in the narrow gap between the original filament and the inside diameter of the orifice and is generated by the pressure difference P1>P2. The internal orifice diameter D of the orifice and the diameter d of the filament must not be too different in order to create a high speed gas flow. Based on experimental results, D>d and D<30 d, preferably D<10 d, more preferably D<5 d and most preferably D<2 d.

The internal orifice diameter, D, mentioned above refers to the diameter of the orifice at the exit end. If cross-section of the orifice is not round, the diameter D refers to the narrowest diameter. Similarly, the filament diameter, d, also refers to the smallest diameter when the cross-section is not round. The smallest cross-section was determined by measuring at ten locations, and an arithmetic average was calculated. In addition, a tapered orifice shape that narrows to the exit without uniform orifice diameter is preferred. As far as the orifice exit is concerned, the exit is at the bottom in a vertically positioned orifice since an original filament ordinarily moves from top to bottom. When an original filament moves from bottom to top, the exit is located on top of the orifice. Similarly, the exit is on a side of an orifice when the orifice is horizontally positioned and an original filament moves in the horizontal direction.

An internal orifice structure with low resistance is desirable since a high speed gas flows inside the orifice as described above. In the present invention, the orifices may be shaped independently, but many openings may be created in a board to obtain a multi opening orifice. A round cross-section of the orifice interior is preferred. When multiple numbers of filaments are generated, or when elliptical or tape shaped filaments are prepared, orifices with elliptical or rectangular cross-sections may be used. In addition, an orifice with a large entrance to easily introduce an original filament and a narrow exit to reduce the run resistance on the filament is preferred since such a shape raises the flow rate from the orifice exit.

The orifice in the present invention plays a different role than a conventional air introduction pipe located before drawing. The conventional air introduction pipe plays a role in focusing a laser beam on a set position on a filament and in transferring an original filament to the set position with lower resistance. The present invention differs in that it adds a high speed gas flow generated by the pressure difference between the pressure P1 of the original filament supply chamber and the pressure P2 of the drawing chamber. Now, in an ordinary spun-bond non-woven cloth manufacturing process, tension is applied to a fused filament using an air-sucker and the like. However, an air-sucker in a spun-bond non-woven cloth manufacturing process and the orifice in the present invention produce totally different action mechanisms and effects. In a spun-bond process, a fused filament is moved with a high speed fluid inside an air-sucker, and most of the attenuation of the filament diameter is completed inside the air-sucker. In contrast, solid filaments are transferred using orifices in the present invention, the filaments are not attenuated inside the orifices, the filaments are irradiated with a laser beam after they exit the orifices, and the drawing are initiated for the first time at this point. In addition, a high speed fluid is generated in a spun-bond process by sending high pressure air into the air-sucker, and the process of the present invention differs in that the high speed fluid is generated inside the orifices by the pressure difference between the chambers before and after the orifices. In addition, the effects differ greatly. In a spun-bond process, the smallest filament diameter obtained is at most about 10 μm. In contrast, nanofilaments with filament diameter less than 1 μm are obtained in the present invention.

The air velocity v at the orifice exit in the orifice used in the present invention is expressed by the equation shown below. (Graham's theorem)

$$v = \{2(P1-P2)/\rho\}^{1/2}$$

Here, $\rho$ is the air density.

The air velocity at an orifice exit and its speed of sound conversion are shown in Table 1 where P1 represents atmospheric pressure and P2 is a negative pressure. In the present invention, the air velocity at the orifice exit is preferably at least 340 m/sec (the speed of sound at 15° C.) and at least 365 m/sec is more preferred.

TABLE 1

| P2 kPa | The air velocity at the orifice exit (m/sec) | Mach number at r.t. |
|---|---|---|
| 85 | 152 | 0.449 |
| 80 | 182 | 0.523 |
| 75 | 204 | 0.600 |
| 70 | 223 | 0.658 |
| 65 | 241 | 0.710 |
| 60 | 258 | 0.759 |
| 50 | 289 | 0.834 |
| 30 | 342 | 0.987 |
| 20 | 365 | 1.06 |
| 6 | 396 | 1.15 |

The original filaments discharged from orifices are heated at the orifice exit with a carbon dioxide laser beam, and they are drawn by the tension generated by the high speed fluid from the orifices. The center of carbon dioxide laser beam should be focused at 30 mm or less from the orifice tip with 10 mm or less preferred and 5 mm or less most preferred. If the focused center separates so far away from the orifice tip, the original filaments swing and move continuously, so they do not remain in a fixed position. Therefore, a carbon dioxide laser beam cannot capture the filaments consistently. In addition, the high speed air from orifices exit loses its speed rapidly once it moves away from the orifices, the tension applied on filaments weaken with distance from the orifices and the consistency also decreases.

The present invention is characterized by heating and drawing original filaments using a carbon dioxide gas laser beam. The carbon dioxide gas laser beam of the present invention has a wavelength about 10.6 μm. The laser can focus its irradiation (beam) tightly and also concentrate on a specific wavelength without wasting much energy. The carbon dioxide gas laser of the present invention has a power density of at least 50 W/cm$^2$, preferably at least 100 W/cm$^2$ and most preferably at least 180 W/cm$^2$. By concentrating high power density energy on a narrow drawing zone, the super high multiple drawing of the present invention is made possible. Now, the laser beam of the present invention may also be used by changing the shape using a beam expander and the like.

The original filaments of the present invention are heated to a temperature appropriate for drawing using a carbon dioxide gas laser beam, and this heated zone which is located along the filament axis within 4 mm up and down (8 mm length) of the filament center is preferred, within 3 mm up and down is more preferred, and within 2 mm up and down is most preferred. The diameter of the beam is measured along the filament axis in motion. In the present invention, original filaments are composed of multiple numbers filament, the diameter of beam is measured along the original filament axis. The present invention makes possible a high degree of attenuation by rapidly drawing in a narrow area, and yields drawn filaments attenuated into the nanofilament size zone. In addition, the frequency of draw fracture was minimized even though the filaments were drawn to a super high multiple. Now, when the original filament irradiated with the carbon dioxide gas laser beam is a multi-filament, the filament center described above identifies the center of a filament bundle in a multi-filament.

Many original polyolefin filaments discharged from orifice are drawn upon irradiation with a laser beam. At this point, the laser beam needs to uniformly hit the many original filaments. In this regard, the entire drawing chamber is finely rotated so that the entire original filaments are uniformly drawn. The drawing is preferably initiated at its ideal rotated position. Now, the entire drawing chamber is not only rotated but is also finely moved in the horizontal direction (direction X), the direction of beam irradiation (direction Y) and the direction of height (direction Z) to seek an ideal position.

A running conveyor is used as the accumulation device for the drawn filaments of the present invention. A conveyor is used to accumulate and stack the drawn filaments to provide an accumulation of super fine filaments or a porous sheet that can be rolled up. A porous sheet comprising nanofilaments can be manufactured using this process. A net-like forwarding unit is ordinarily used as the conveyor in the present invention, but a belt or a cylinder may also be used for the accumulation.

A winding device for filaments, sheets and the like may also be used as the accumulation device for the drawn filaments of the present invention. A winder equipped with a tubular paper tube or an aluminum tube corresponding to the width of the descending, drawn filaments and rotated about its axis is used to directly accumulate, capture and wind the drawn filaments onto such a tubular material.

When a winder is used as the accumulation device, the installation of a collection guide that bows from the wall along the winding axis is desirable. The collection guide has a width corresponding to the width of the many drawn filaments descending onto the outside of the rotating tube. The corresponding width refers to a width wider than the descending filaments. A width that is about 50 mm wider on both sides is preferred, and a width that is about 100 mm wider on both sides is most preferred. When drawn filaments moving from orifices along with high speed air are wound axially, the high speed air is reflected along the winding axis and is diffused to the surrounding space. The filaments accumulated along the winding axis are sometimes disturbed. In such a case, the high speed air is curved in the direction of the rotating axis by the collection guiding wall to prevent wandering of the drawn filaments. The distance along the axial winding to the collection guide wall is 500 mm or less, and 200 mm or less is preferred and 100 mm or less is most preferred.

The drawn filaments accumulated on a conveyor are preferably heat-set to form a sheet. When heat-set, the porous sheet of the present invention can be used as a battery separator possessing dimensional stability and thermal stability. Thus the porous sheet is preferably wound on a sheet winding device installed inside a drawing chamber. The heat-setting is executed by passing the porous sheet through a space in which hot air is circulated or by passing the porous sheet over a roller heated using induction heating and the like. The heat setting temperature for a porous sheet comprising polyolefin nanofilaments of the present invention is preferably in a temperature range that is higher than 30° C. below the polyolefin melting point and lower than 5° C. below the melting point and more preferably in a temperature range that is higher than 20° C. below the melting point and lower than 10° C. below the melting point.

The draw ratio λ in the present invention is represented by the equation below using the original filament diameter, do, and the filament diameter after drawing, d. In this case, the calculations were made on the assumption that the filament density was constant. The filament diameter was measured using a scanning electron microscope (SEM). The original filament was photographed at a magnification of one hundred, and the drawn filaments were photographed at a magnification of one thousand or greater. The average value of one hundred measurements was used.

$$\lambda=(do/d)^2$$

The drawn filament of the present invention undergoes molecular orientation during drawing and becomes thermally stable. The drawn filament of the present invention has a very small filament diameter, and then the molecular orientation of the filament is difficult to measure. Thermal analysis results indicated that the drawn filament of the present invention is not only thin but also has molecular orientation. The differential scanning calorimeter (DSC) measurements of the original filaments and drawn filaments were made using THEM PLUS2 DSC8230 manufactured by Rigaku K. K. at a temperature increase rate of 10° C./min.

Advantages of the Invention

The battery separator of the present invention is a porous sheet comprising nanofilaments and has a high porosity ratio and low internal resistance to yield good conductivity. Furthermore, the battery separator of the present invention prevents passing of active electrode substances that cause deterioration of the electrodes and controls lithium metal deposition (dendrites) to prevent short circuits and enhance safety, which becomes the separator particularly suitable for secondary lithium batteries. Since the separator of the present invention comprises polyolefin filaments, it is chemically stable and has chemical resistance that prevents separator decomposition in electrolysis solutions. Since it is a polyolefin the separator, it also has oxidation resistant and can extend the battery life. In addition, the filament diameter is consistent and the porous sheet has very uniform pore size, to yield high performance and stability in a separator. Furthermore, the polyolefin nanofilament constituting the battery separator of the present invention is highly drawn and exhibits extensive molecular orientation. So the battery separator gains the exceptional strength, which improves its physical strength and makes handling of the separator easier when incorporating it into a battery. In addition, since the porous sheet used as a battery separator in the present invention is highly heat treated, it is characterized by excellent dimensional stability and safety.

The ES process used previously to produce nanofibers included a step in which a polymer is dissolved in a solvent, and the solvent needed to be removed from the product. This method made the production process complex and made the production cost increasing. In addition, the product that was obtained experienced quality problems, such as the formation of small resin lumps, and a broad filament diameter distribution. In addition, the fibers obtained were short fibers, and their lengths were from several millimeters to at most several tens of millimeters.

The present invention yields polyolefin nanofilaments with improved molecular orientation that are readily obtained using simple means without requiring a special high precision, highly sophisticated device. The present invention is characterized by the fact that drawn filaments can be wound directly on a winding device to obtain a porous sheet. Therefore, the present invention presents a means to manufacture a high performance battery separator consistently and with good productivity.

Furthermore, the present invention allows nanofilaments to be manufactured in a sealed chamber in a closed system and prevents dispersion of the nanofilaments obtained into the atmosphere as is the case with melt-blown nonwoven fabrics manufacturing process or ES process conducted in an open system. Therefore, the present invention can help maintain a very safe work environment.

DETAILED DESCRIPTION OF THE INVENTION

Figure 1:
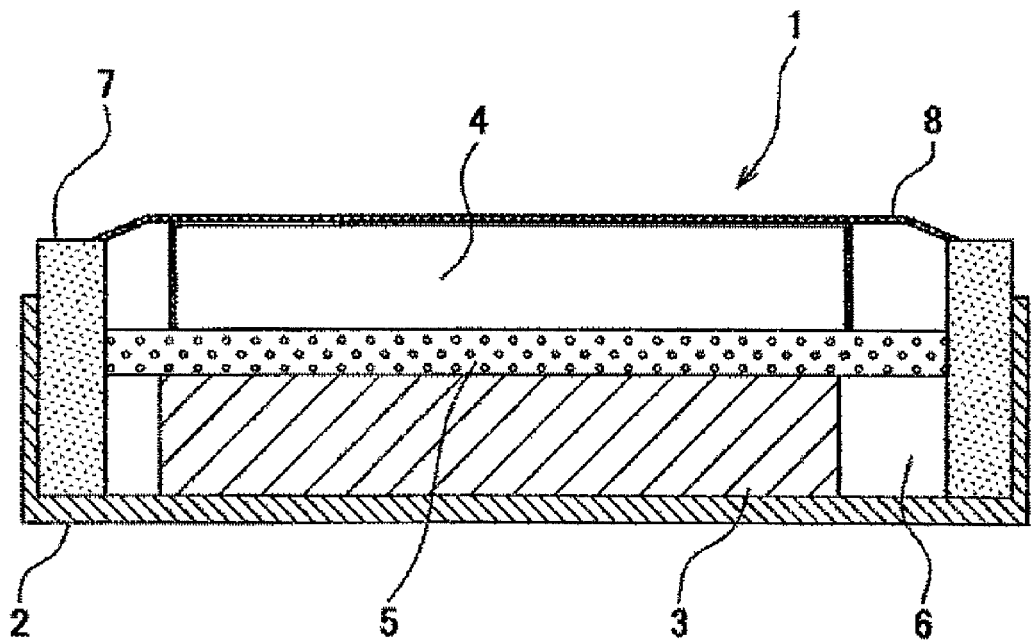
FIG. 1 is a cross-sectional drawing of an example of a battery with the battery separator of the present invention.

Examples of the embodiments of the present invention are described below using the figures. FIG. 1 is the cross-sectional view of a battery used in a performance test for the battery separator of the present invention. Battery 1 contains a positive electrode 3 and a negative electrode 4 facing each other inside a can 2. A battery separator 5 that is a porous sheet comprising polyolefin nanofilaments of the present invention is sandwiched between the positive electrode 3 and negative electrode 4, and the surrounding space is immersed in an electrolyte solution 6. The positive electrode 3, negative electrode 4, separator 5, electrolyte solution 6 and the like inside the can 2 are covered with a lid 8 through a packing material 7. Since the can 2 and the lid 8 are conductive, the can 2 plays as a positive electrode terminal and the lid 8 plays as a negative electrode terminal. So, electrical energy can be discharged.

Figure 2:
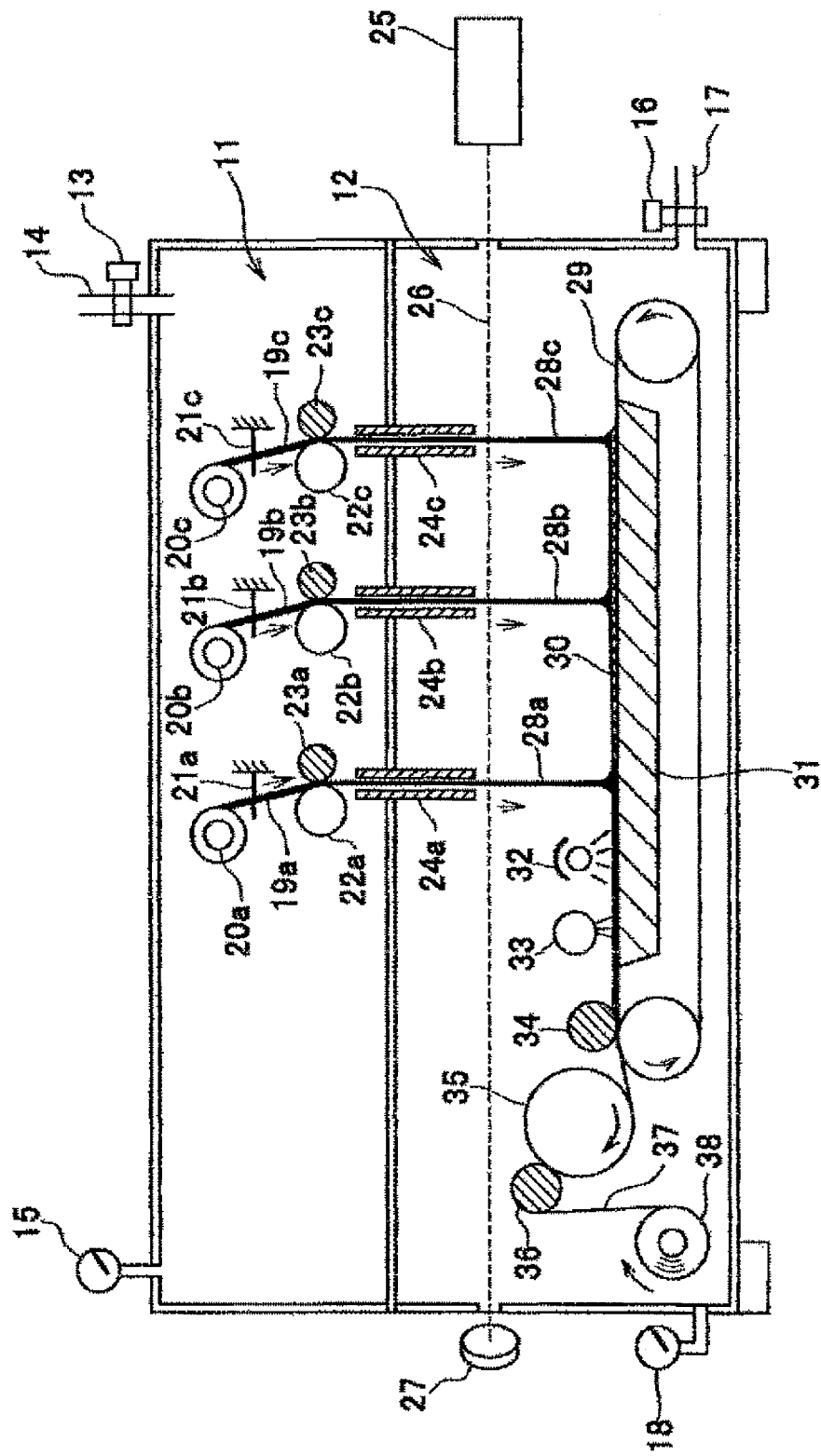
FIG. 2 is a cross-sectional drawing of an apparatus, illustrating an example in which original filaments supply chamber in the present invention is a chamber at P1 pressure and a drawing chamber is a chamber at P2 pressure.

FIG. 2 is a cross-sectional view showing an example of a equipment used to manufacture a porous sheet comprising polyolefin nanofilaments used in the battery separator of the present invention. The original filaments supply chamber 11 is a chamber at P1 pressure, and the drawing chamber 12 is a chamber at P2 pressure. The original filaments supply chamber 11 is connected to a compressor (or a vacuum pump) through a valve 13 and a pipe 14. Pressure P1 is controlled by reference to a pressure gauge 15. The drawing chamber 12 is connected to a vacuum pump (or a compressor) through a valve 16 and a pipe 17. Pressure P2 is controlled by reference to a pressure gauge 18. The polyolefin original filaments 19a, 19b, 19c are wound on reels 20a, 20b and 20c are let-off at a constant speed from nip rollers 22a, 23a, 22b, 23b, 22c, 23c through combs 21a, 21b, 21c to orifices 24a, 24b, 24c.

The space after the exit from the orifices 24a, 24b and 24c in FIG. 2 is the drawing chamber 12 at P2 pressure. The polyolefin original filaments 19a, 19b, 19c, exiting the orifices 24 are introduced into the drawing chamber 12 along with high speed air generated by the pressure difference, P1-P2, between the original filaments supply chamber 11 and the drawing chamber 12. The discharged polyolefin original filaments 19a, 19b, 19c are irradiated immediately under the orifice with a laser beam 26 generated by a carbon dioxide gas laser beam emitting device 25. The laser beam 26 is used to irradiate the moving original filaments 19a, 19b and 19c. A laser beam power meter 27 is installed at the location reached by the laser beam 26, and the laser power is preferably adjusted to a constant level. Tension is applied to the lower section of the original filaments 19a, 19b, 19c heated with the laser beam 26 by the high speed air generated by the pressure difference P1-P2 to draw the filaments. The drawn filaments 28a, 28b, 28c descend and are accumulated on a conveyor 29 to form a porous sheet 30 comprising numerous polyolefin nanofilaments.

In FIG. 2, the polyolefin porous sheet 30 on the conveyor 29 is preferably stabilized by suction from a negative pressure suction chamber 31 at the back of the conveyor 29. The polyolefin porous sheet 30 is preferably heat treated with at least one of the heat treatment means described below. The heat treatment means 1) involves a heat treatment using a radiated heat from an infrared lamp 32 to heat treat a polyolefin porous sheet 30. The heat treatment means 2) involves heating of a polyolefin porous sheet 30 with a hot air ejected from a hot air nozzle 33. The porous sheet 30 discharged from a conveyor 29 is preferably compressed using a rubber roller 34 on the conveyor 29 to form a sheet. The heat treatment means 3) involves treating a polyolefin porous sheet 30 discharged from the conveyor 29 using a heated roller 35 and compressing using a rubber roller 36 to form a sheet. The heat treated polyolefin porous sheet 37 is wound on a winding roller 38.

Figure 3:
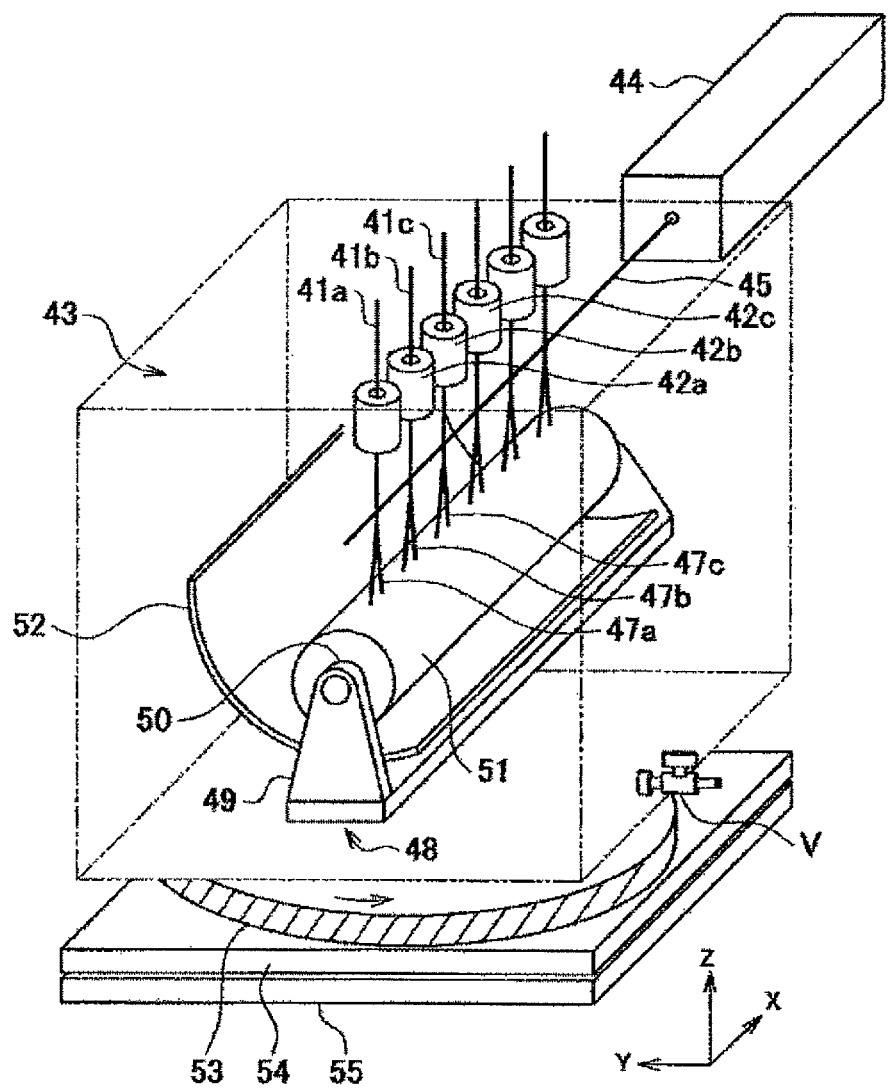
FIG. 3 is an oblique perspective drawing of an example in which polyolefin nanofilaments are obtained and the filaments are accumulated directly on a winding device.

FIG. 3 shows an oblique perspective drawing of an example of an equipment that uses a winding device as a filament accumulation device in the present invention and contains a collection guide inside a drawing chamber. Numerous polyolefin original filaments 41a, 41b, 41c . . . pass through a filament supply device (not shown in the drawing) and are led into a drawing chamber 43 under pressure, P2, (maintained under negative pressure in this drawing using a valve V) through orifices 42a, 42b, 42c . . . . The laser beam 45 emitted from a carbon dioxide gas laser emitting device 44 irradiates many original filaments 41a, 41b, 41c . . . immediately under the orifices 42. The laser beam 45 passes through a window comprising Zn—Se before it is introduced into the drawing chamber 43, but the window is not shown in the drawing. The original filaments 41a, 41b, 41c . . . are drawn using the heating caused by the laser beam 45 and the tension applied to the lower section of the filament by the high speed air generated by the pressure difference between P1 and P2. The drawn filaments 47a, 47b, 47c . . . descend and are wound directly on a winding device 48. The winding device 48 comprises a winding tube 50 attached to a winding trestle 49, and a motor (not shown in the drawing) drives the winding tube 50 to rotate. The drawn filaments 47 are wound directly on the winding tube 50 where they accumulates and form a porous sheet 51 comprising numerous polyolefin nanofilaments. The drawing chamber 43 is characterized by the presence of a collection guide 52 that curves along the winding tube 50. The collection guide 52 stabilizes the polyolefin porous sheet 51, winds the sheet around the winding tube 50 and yields a polyolefin porous sheet 51 with good texture.

Now, in FIG. 3, the drawing chamber 43 is mounted on fine position adjustment platforms 53, 54 and 55, and the position is finely adjusted to optimally collect the polyolefin original filaments 41a, 41b, 41c exiting from orifices 42a, 42b, 42c in the irradiation zone of the laser beam 45. The lower most fine position adjustment platform 55 adjusts up and down (Z axis), the middle fine position adjustment platform 54 adjusts horizontally (X and Y axis) and the topmost fine position adjustment platform 53 is a turntable that finely adjusts the position by rotating.

Example 1

Figure 4:
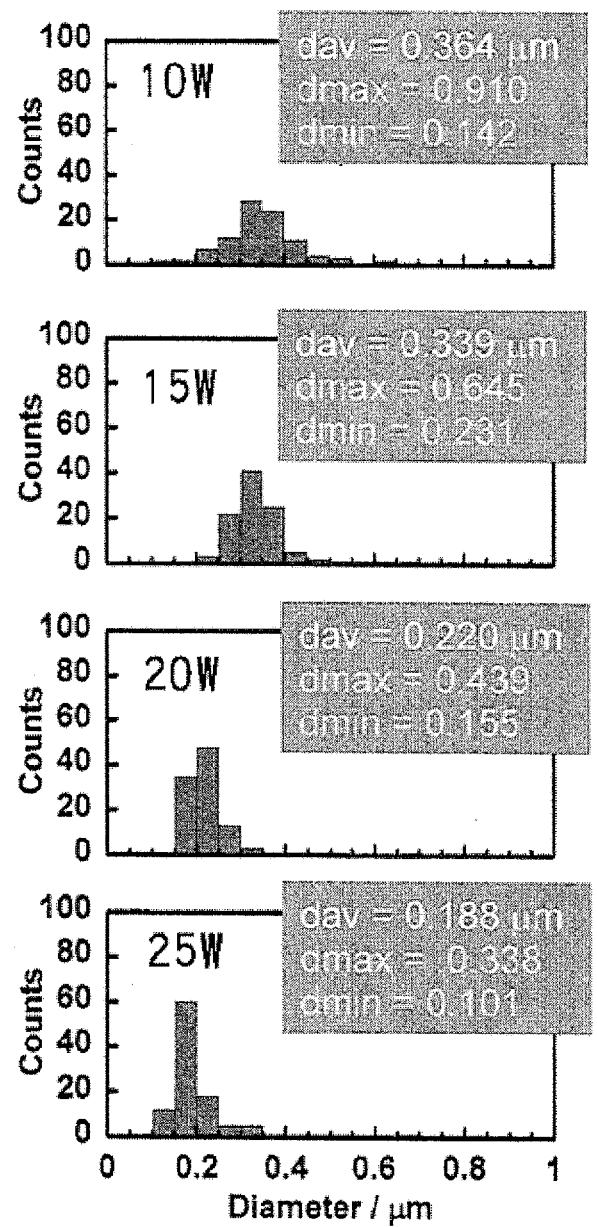
FIG. 4 is a histogram of the filament diameter measurements of filaments drawn in the present invention.
Figure 5:
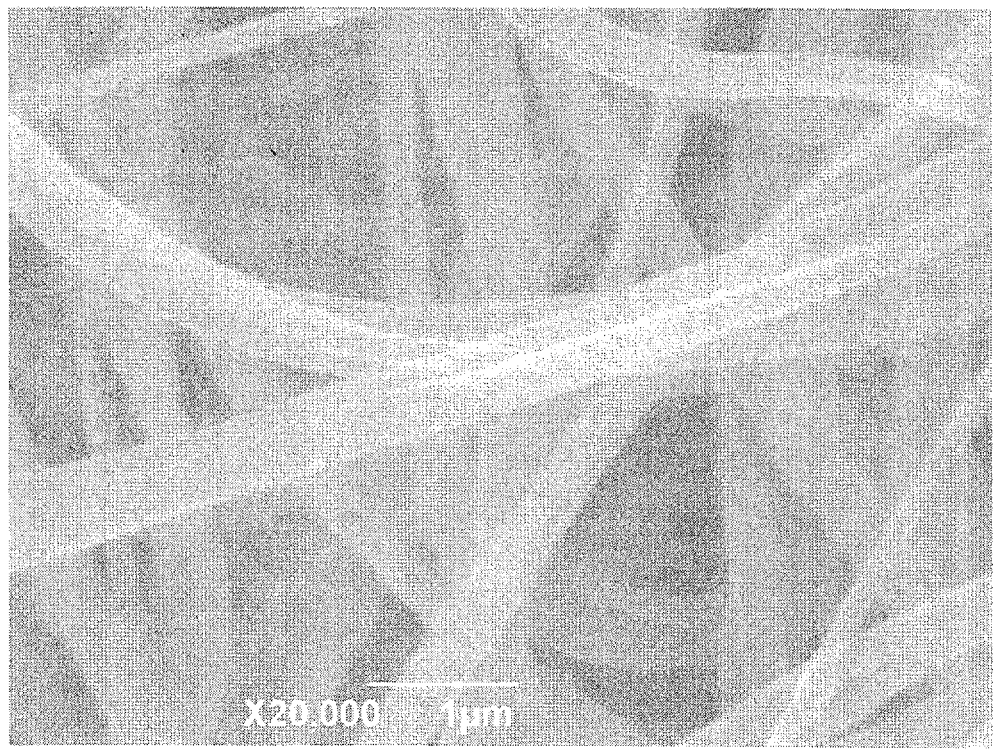
FIG. 5 is a scanning electron microscope image (20,000 magnification) of filaments obtained when the laser power was 20 W.
Figure 6:
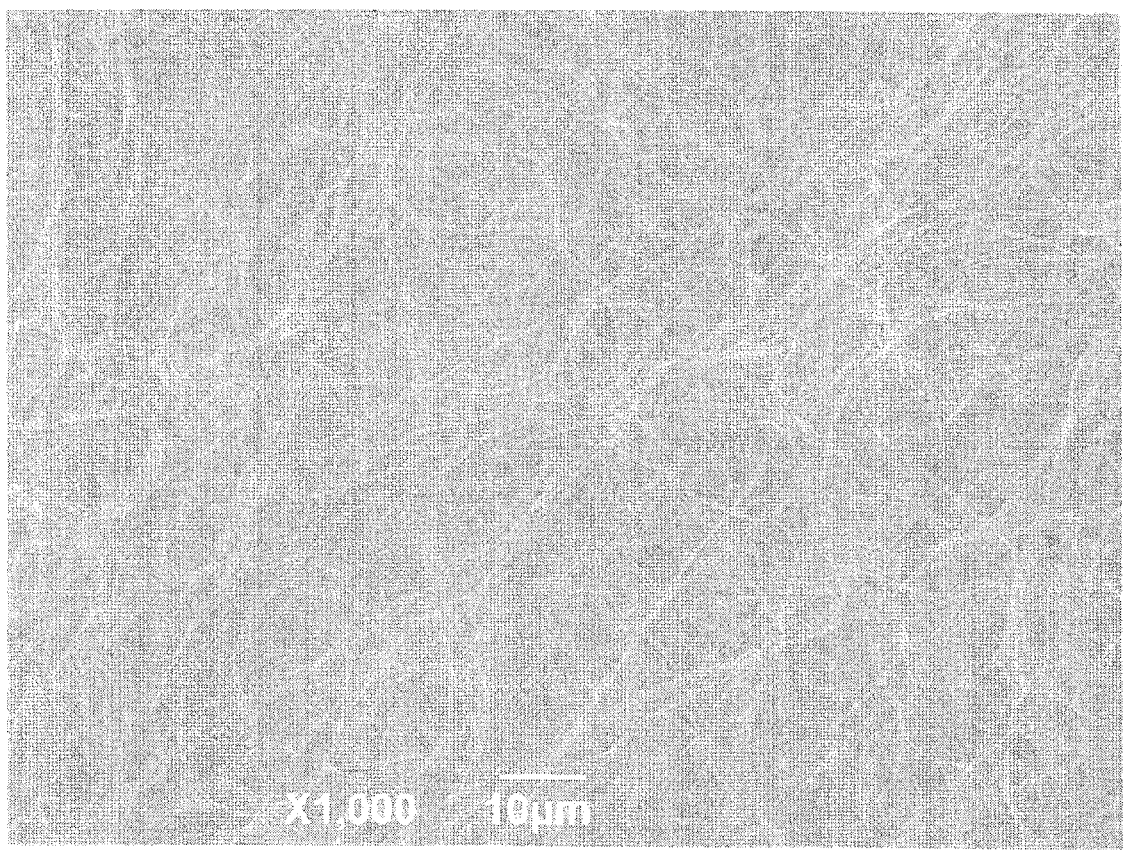
FIG. 6 is a scanning electron microscope image (1,000 magnification) of filaments obtained when the laser power was 20 W.
Figure 7:
FIG. 7 is a scanning electron microscope image (20,000 magnification) of filaments obtained when the laser power was 25 W.

163.2 µm polypropylene filaments were prepared as original filaments. The weight average molecular weight of the polymer was 349,000, and the number average molecular weight was 89,300. The isotacticity was 92.4%. In the equipment shown in FIG. 3, the laser beam diameter of the laser generated by the carbon dioxide gas laser emitting device was 3.5 mm. The experiment was conducted using an internal orifice diameter of 0.3 mm, seven orifices and filament supply rate of 0.1 m/min. The drawing ratios calculated using the filament diameter when the laser power was changed from 10 W to 25 W at a degree of vacuum in the drawing chamber of 10 kPa are shown in Table 2. According to the data in Table 2, the average filament diameter was already in the nanofilament zone when the laser power was 10 W, and the standard deviation for the filament diameter distribution was as low as 0.12. Thus the calculated drawing ratio exceeded 200,000. The standard deviation further decreased to 0.0455 for an average filament diameter of 220 nm at a laser power of 20 W, and the drawing ratio reached 550,000. The average filament diameter was 200 nm or smaller when the laser power was 25 W, and the drawing ratio reached 750,000. A histogram of the filament diameter distribution at laser power settings of 10 W, 15 W, 20 W and 25 W is shown in FIG. 4. In addition, scanning electron microscope images (SEM images) of the filaments obtained at a laser power setting of 20 W are shown in FIG. 5 (20,000 magnification) and FIG. 6 (1,000 magnification). The SEM images demonstrated that the filaments were continuous filaments with no lumps and the filament diameter was uniform. In addition, the SEM images (20,000 magnification) of the filaments obtained using a laser power setting of 25 W is shown in FIG. 7.

TABLE 2

| | Filament Diameter | | | | |
|---|---|---|---|---|---|
| Sample | max. µm | min. µm | av. µm | Standard deviation | Drawing Ratio |
| original | | | 163.2 | | 1 |
| Power 10 W | 0.910 | 0.142 | 0.364 | 0.1216 | 201,018 |
| Power 15 W | 0.645 | 0.231 | 0.339 | 0.0624 | 231,763 |
| Power 20 W | 0.439 | 0.155 | 0.220 | 0.0455 | 550,296 |
| Power 25 W | 0.338 | 0.101 | 0.188 | 0.0467 | 753,576 |

Filament supply rate: 0.1 m/min
P2: 10 kPa

Example 2

Figure 8:
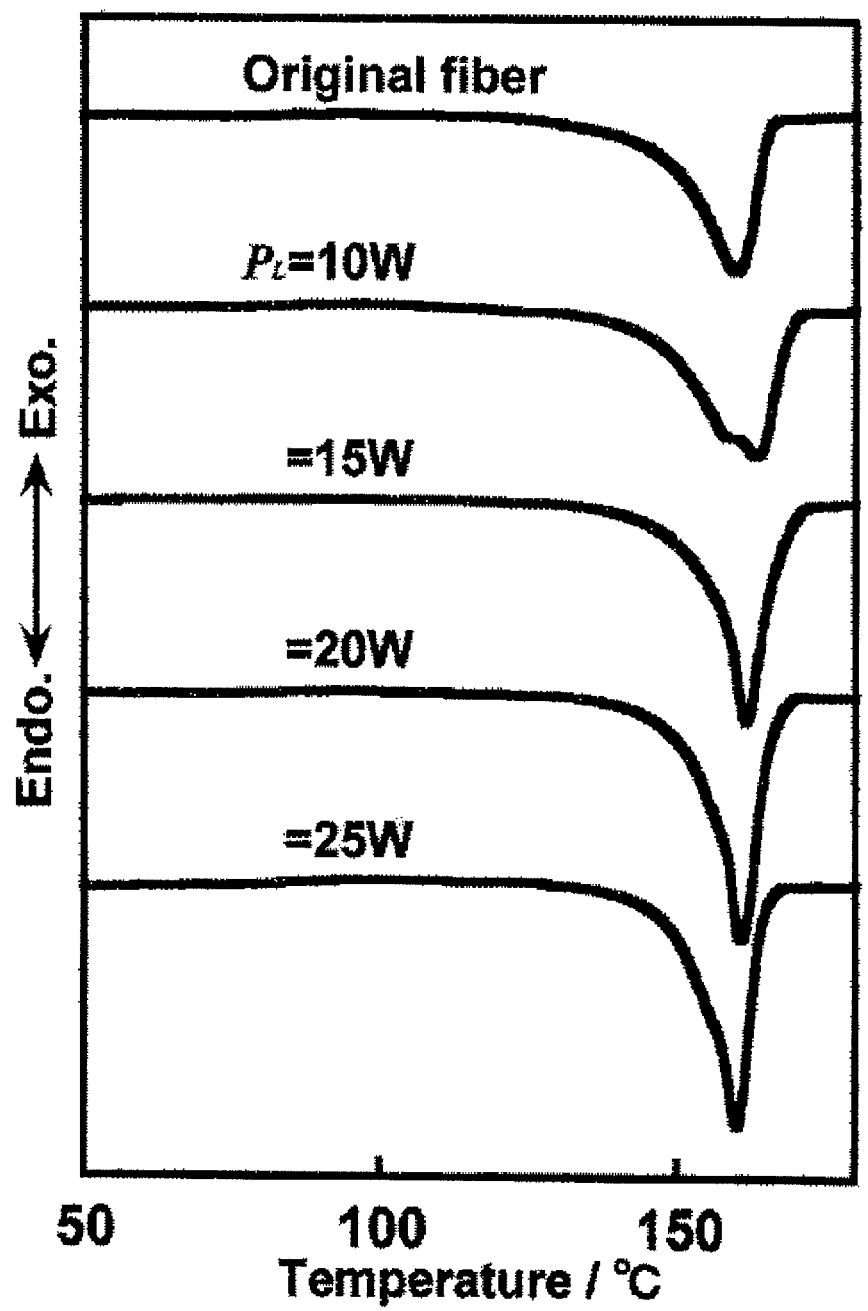
FIG. 8 shows endothermic curves obtained using differential scanning calorimetry measurements of nanofilaments constituting the porous sheet of the present invention.

Differential scanning calorimetry (DSC) measurements were conducted on the filaments obtained in Example 1, described above, and the results are shown in Table 3 and FIG. 8. The FIG. 8 showed that the endothermic peak was suddenly sharpened upon drawing, indicating increase in crystallinity. The table 3 also showed increase in melting point, the heat of fusion ($\Delta Hm$) and the crystallinity indices (Xc) as average filament diameter (day) decreased. These results suggested the enhanced molecular orientation in the filaments.

TABLE 3

| Sample | Tm (° C.) | $\Delta Hm$ (J/g) | Xc (%) | dav (nm) |
|---|---|---|---|---|
| Original Filament | 159.9 | −95.84 | 45.9 | 163.2 |
| Power 10 W | 158.7/163.1 | −104.07 | 49.8 | 0.364 |
| Power 15 W | 161.6 | −106.08 | 50.8 | 0.339 |
| Power 20 W | 160.7 | −110.64 | 52.9 | 0.220 |
| Power 25 W | 160.0 | −108.8 | 51.1 | 0.188 |

Filament supply rate: 0.1 m/min
P2: 10 kPa

Example 3

Figure 9:
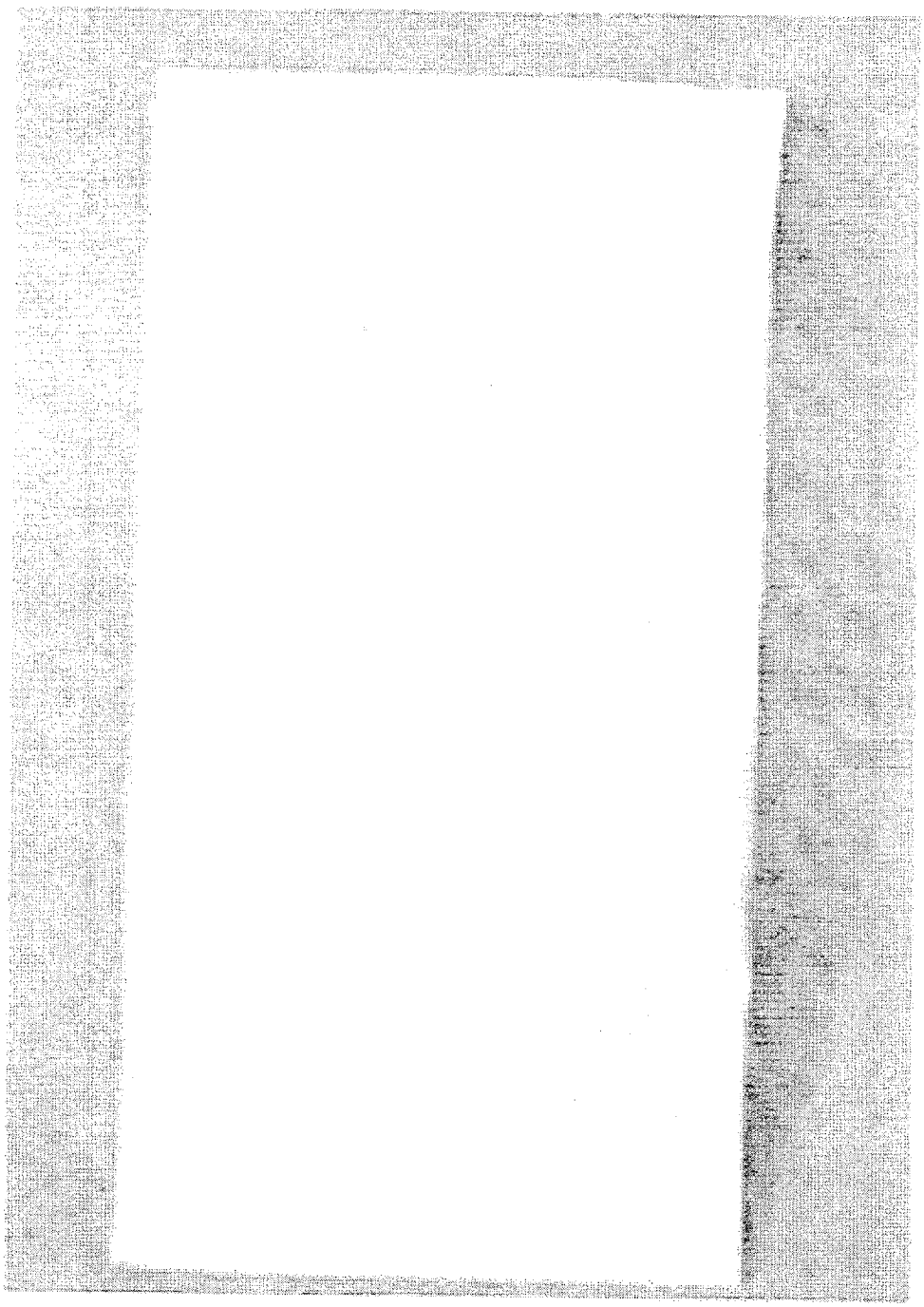
FIG. 9 is an outside appearance photograph of a single layer laminate cell with a porous sheet.

The equipment in Example 1 was used with the same original filaments. The filaments were directly wound for ten minutes on a winding tube in the lower section (FIG. 3) using a drawing chamber with a degree of vacuum of 20 kPa, filament supply rate of 0.1 m/min and laser power of 20 W. The wound sheet was cut from the winding tube to obtain porous sheets 18 cm wide, 17 cm long, with a weight of 4.16 g/m$^2$ and average filament diameter of 0.409 µm. A single layer laminated cell with a battery separator obtained using this sheet was prepared (FIG. 9), and various properties of the battery were measured. The results are shown in Tables 4 and 5. Now, the comparative example was a monoaxially drawn porous polypropylene film (trade name "CELGARD," 25 μm thick). The positive electrode of the battery was a molded product containing 89 wt % LiCoO$_2$, 6 wt % conductive carbon black and 5 wt % binder [poly(vinylidene fluoride)]. The negative electrode was molded using 90 wt % mesocarbon graphitized micro-beads with 10 wt % poly (vinylidene fluoride) used as the binder. The electrolyte solution was obtained by dissolving 1 mole/liter of LiPF$_6$ in a 1:1 mixed solvent (volumetric ratio) of ethylene carbonate and dimethyl carbonate. Using such a battery, an eight hour constant current, constant voltage charging test was conducted at a charging current of 1.8 mA and charging voltage of 4.2 V. The alternate current impedance was subsequently measured at each frequency, and the results are shown in Table 4. The examples had lower electrical resistance at each frequently when compared to comparative examples. In addition, an eight hour constant current, constant voltage charging test was conducted at a charging current of 1.8 mA and charging voltage of 4.2 V. The battery was subsequently discharged at a discharge current of 1.8 mA to 2.7 V to measure the initial capacity of the battery. Then, only the discharge current was changed to 18 mA, and the charge-discharge cycle was repeated. The results (Table 5) clearly showed superiority of the examples to the comparative examples in the capacity and capacity retention at increased discharge current.

TABLE 4

| Frequency (Hz) | Example | Comparative Example |
| --- | --- | --- |
| 20000 | 0.61 Ω | 1.11 Ω |
| 1000 | 1.15 Ω | 1.63 Ω |
| 1 | 4.03 Ω | 4.90 Ω |
| 0 | 4.40 Ω | 5.28 Ω |

TABLE 5

| | | Discharge Current | |
| --- | --- | --- | --- |
| | | 1.8 mA | 18 mA |
| Example | Capacity/mAh | 8.75 | 8.21 |
| | Capacity Retention (%) | 100 | 93.8 |
| Comparative Example | Capacity/mAh | 8.66 | 8.03 |
| | Capacity Retention (%) | 100 | 91.8 |

Example 4

Figure 10:
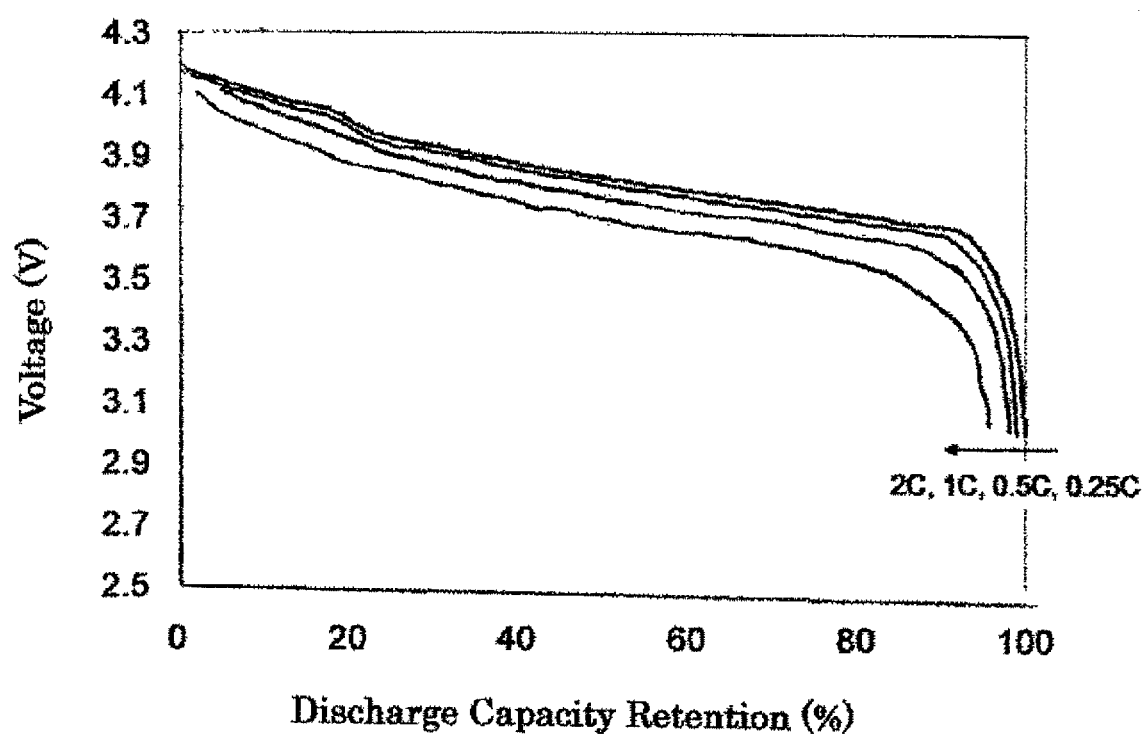
FIG. 10 shows discharge curves of battery A in discharge rate test, using a porous sheet of the present invention.
Figure 11:
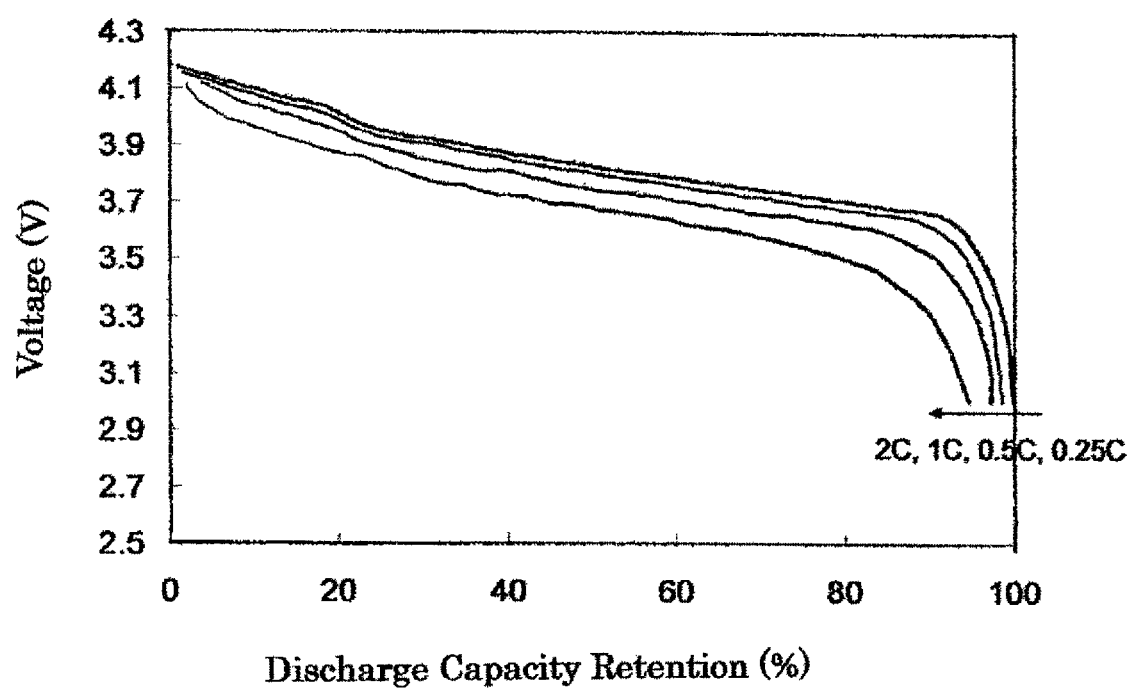
FIG. 11 shows discharge curves of battery B in discharge rate test, using a porous sheet of a comparative example.

The separator of the present invention was evaluated using a model 2032 coin battery and tests were conducted in the manner described below. The positive electrode was prepared as described below. NMP was added to a mixture of 90 wt. % of LiCoO$_2$ used as the cathode active material, 5 wt. % of acetylene black used as the conductive additive and 5 wt. % of PDVF used as the binder, and a slurry was prepared upon mixing. The slurry was dropped onto an aluminum current collector, and a film was formed using a film applicator equipped with a micrometer and an automatic coating device. After dried in a 110° C. oven in a nitrogen atmosphere, the film was stamped out and pressed to form disk shape positive electrode with a diameter of 15 mm. The positive electrode contained about 26 mg of the active material. The negative electrode was prepared as described below. NMP was added to a mixture of 94 wt. % of a artificial graphite used as the anode active material, 1 wt. % of acetylene black as the conductive additive and 5 wt. % PVDF as the binder, and a slurry was prepared upon mixing. The slurry was dropped onto a copper current collector, and a film was formed using a film applicator equipped with a micrometer and an automatic coating device. After dried in a 110° C. oven in a nitrogen atmosphere, the film was stamped out and pressed to form disk shape negative electrode with a diameter of 15 mm. The negative electrode contained about 13 mg of the active material. The positive electrode, negative electrode, an electrolyte solution obtained by dissolving 1 mole/liter of LiPF$_6$ in a mixed solvent of ethylene carbonate and dimethyl carbonate in a volumetric ratio of three to seven and the separator stamped out into a disk were used to prepare a coin battery. A polypropylene nanofilament sheet of the present invention with filament diameter of about 0.4 μm and weight of 6 g/m$^2$ was used to prepare Battery A. As a comparative example, a battery with the separator of a polypropylene porous film (trade name "CELGARD," PP, 25 μm) was prepared. This battery was referred as Battery B. The coin batteries prepared in the manner described above were placed inside a 25° C. constant temperature vessel and charge-discharge tests were conducted. Now, the designed battery capacity was about 4 mAh. The first eight hours of charging were conducted at 0.5 C constant current and 4.2V constant voltage, and the battery was subsequently discharged to 3V at 0.25 C constant current. The battery was rested for 10 minutes after discharged. Then, the batteries were subjected to discharge rate test. The discharge current was increased for each cycles from 0.25 C, 0.5 C, 10 up to 2 C while charging process was conducted at a constant current of 0.5 C and constant voltage of 4.2V for four hours throughout the discharge rate test. 10 minutes rest was also included after discharging in each cycle. The curves of the discharge rate test for Batteries A and B are shown in FIGS. 10 and 11, respectively. The discharge capacity retention was normalized using the discharge capacity at 0.250 as the standard, and the results are summarized in Table 6. The result (Table 6) clearly indicated that Battery A had a higher discharge capacity retention than Battery B at a high C rate. Therefore, the use of the nanofilament sheet of the present invention as the separator improved the battery properties at a high C rate, compared to the batteries prepared using conventional porous films.

TABLE 6

| | 0.25 C | 0.5 C | 1.0 C | 2.0 C |
| --- | --- | --- | --- | --- |
| Battery A | 100 | 99.0 | 98.0 | 96.0 |
| Battery B | 100 | 98.6 | 97.1 | 94.9 |

INDUSTRIAL APPLICABILITY

The present invention relates to a battery separator constituting a porous sheet comprising polyolefin nanofilaments.

DESCRIPTION OF THE SYMBOLS

1: Battery
2: Can
3: Positive electrode
4: Negative electrode
5: Battery separator 6: Electrolyte solution
7: Packing
8: Lid
11: Original filament supply chamber
12: Drawing chamber
13: Valve
14: Pipe
15: Pressure gauge
16: Valve
17: Pipe
18: Pressure gauge
19: Polyolefin original filament
20: Reel
21: Comb
22, 23: Feeding nip rollers
24: Orifice
25: Carbon dioxide gas laser emitting device
26: Laser beam
27: Power meter
28: Drawn filament
29: Conveyor
30: Polyolefin porous sheet
31: Negative pressure suction chamber
32: Infrared lamp
33: Hot air nozzle
34: Rubber roller
35: Heated roller
36: Rubber roller
37: Polyolefin nanofilament porous sheet
38: Winding roller
41: Polyolefin original filament
42: Orifice
43: Drawing chamber
44: Carbon dioxide laser emitting device
45: Laser beam
47: Drawn filament
48: Winding device
49: Winding trestle
50: Winding pipe
51: Porous sheet
52: Collection guide
53, 54, 55: Fine position adjusting platform

What is claimed is:

1. A method of manufacturing for a battery separator, comprising steps of A, B and C;

(A) Porous sheet manufacturing step
A porous sheet manufacturing process containing,
  a. a step in which original filaments comprising polyolefin polymer are transported at a constant speed using a transfer means under P1 pressure,
  b. a step in which the original filaments are led into a drawing chamber under P2 pressure (P1>P2) through orifices,
  c. a step in which the original filaments that passed through said orifices are heated using carbon dioxide gas laser beam irradiation and drawn using the traction generated by the gas flow from said orifices caused by the pressure difference between P1 and P2 in the drawing chamber, and
  d. a step in which drawn less than 1 µm filaments are accumulated, further wherein the drawn filaments accumulated have a filament diameter such that a standard deviation of the filament diameter distribution is 0.2 or lower (B) Pretreatment step
A pretreatment step comprising at least one of the steps of,
  a. a step in which the porous sheet is heat treated at least 30° C. below the melting point and
  b. a step in which a surface of the porous sheet is chemically treated (C) A step in which the porous sheet pretreated with the pretreatment is incorporated into a battery.

2. A method of manufacturing for the battery separator according to claim 1, wherein the P1 pressure is atmospheric pressure and the P2 pressure is a negative pressure.

3. A method of manufacturing for the battery separator according to claim 1, wherein a gas speed at the orifice exit is at least the speed of sound in the step in which the original filaments pass through the orifices and are led into the drawing chamber under P2 pressure (P1>P2).

4. A method of manufacturing for the battery separator according to claim 1, wherein the drawn and accumulated filaments are drawn to a multiple of at least 100,000.

5. A method of manufacturing for the battery separator according to claim 1, wherein the drawn filaments are accumulated on a conveyor moving inside the drawing chamber.

6. A method of manufacturing for the battery separator according to claim 1, wherein the drawn filaments accumulated are wound around a rotating axis of a winding device in the drawing chamber to effectively wind the filaments and the like on the rotating axis aided by a collection guide with a wall that curves around said rotating axis and the width corresponding to the width of descending the drawn filaments.

7. A laminated cell with a secondary lithium ion battery wherein the separator manufactured according to the method of claim 1 is used as the separator in the battery comprising positive electrode, separator, electrolyte solution and negative electrode.

* * * * *